United States Patent [19]
Heeringa

[11] Patent Number: 6,016,260
[45] Date of Patent: Jan. 18, 2000

[54] SWITCHED-MODE POWER SUPPLY WITH CURRENT AND VOLTAGE LIMITATION

[75] Inventor: Schelte Heeringa, Drachten, Netherlands

[73] Assignee: U.S. Philips Corporation, New York, N.Y.

[21] Appl. No.: 09/208,511

[22] Filed: Dec. 9, 1998

[30] Foreign Application Priority Data

Dec. 10, 1997 [EP] European Pat. Off. ............. 97203864

[51] Int. Cl.$^7$ .................................................. H02M 3/335
[52] U.S. Cl. .................................. 363/21; 363/19; 363/97
[58] Field of Search .................................. 363/18, 19, 20, 363/21, 56, 97, 131

[56] References Cited

U.S. PATENT DOCUMENTS

| | | | |
|---|---|---|---|
| 4,985,818 | 1/1991 | Niederreiter | 363/19 |
| 4,996,638 | 2/1991 | Orr | 363/21 |
| 5,101,334 | 3/1992 | Plagge et al. | 363/19 |
| 5,408,402 | 4/1995 | Nonnenmacher | 363/21 |
| 5,717,578 | 2/1998 | Afzal | 363/21 |
| 5,757,629 | 5/1998 | Yntema et al. | 363/21 |

FOREIGN PATENT DOCUMENTS

97/30574  8/1997  WIPO .

*Primary Examiner*—Adolf Deneke Berhane
*Attorney, Agent, or Firm*—Ernestine C. Bartlett; Bernard Franzblau

[57] ABSTRACT

A switched-mode power supply uses duty cycle control for the switching transistor. The primary current through the primary winding is sensed by means of a sensing resistor in series with the switching transistor. The voltage across the sensing resistor is differentiated, compared with a reference and integrated. The integrated signal lengthens the off period of the switching transistor, thereby limiting the peak value of the primary current at the beginning of the on period of the switching transistor. The peak value of the primary current at the end of the on period is limited by sensing the voltage across the sensing resistor. The combined limitations of the primary current ensure that the output current of the switched-mode power supply is limited in a well-defined manner.

19 Claims, 8 Drawing Sheets

SWITCHED-MODE POWER SUPPLY WITH CURRENT AND VOLTAGE LIMITATION

BACKGROUND OF THE INVENTION

This invention relates to a switched-mode power supply, comprising: a series arrangement of a controllable switching element and an inductive element, connected to receive an input voltage, means for rendering the controllable switching element conductive during an on period, so as to produce a current through the series arrangement, which current increases from a minimum value at the beginning of the on period to a maximum value at the end of the on period, and for rendering the controllable switching element non-conductive during an off period.

Such a switched-mode power supply is known from the International Application WO 97/30574. In said known power supply the inductive element is the primary winding of a transformer and the controllable switching element is a switching transistor. The transformer further has a secondary winding which supplies an output current to a battery to be charged and/or another load via a rectifier diode. A problem with this known load is the output current limitation in the event of a short-circuit of the load to be powered. A short-circuit can occur in the case of a defect in the load or in the battery to be charged. In rechargeable electrical apparatuses, such as shavers, tooth-brushes, vacuum-cleaners, telephone sets and the like, which are placed in a stand or holder in order to charge the battery, the risk of a short-circuit is also substantial because the contact pins of the power supply can inadvertently come into contact with a conductive object. The same can happen if the power supply is incorporated in a mains voltage adapter or power plug which supplies charging current to the rechargeable apparatus. The outlet of the adapter can be short-circuited inadvertently.

A customary method of current-limiting, which is also used in the known power supply, is to limit the maximum value Ipmax of the primary current. For this purpose, the primary current is measured and the switching transistor is turned off as soon as the primary current exceeds a certain value. However, in this case the average output current can still run high when the switched-mode power supply starts to operate in the continuous conduction mode, which means that the switching transistor is turned on again before the output current has decreased to zero. The primary current then increases each time from a minimum value Ipmin at the beginning of the on period to the maximum value Ipmax at the end of the off period. When the load to be powered is short-circuited the average output current is approximately equal to n*(Ipmax+Ipmin)/2, where n is the transformation ratio. Since the output is short-circuited the output current can hardly decrease in value during the off period. In that case the maximum value Ipmax is reached almost immediately during the on period, as a result of which the output current rises to approximately n*Ipmax.

SUMMARY OF THE INVENTION

It is an object of the invention to provide a switched-mode power supply having an improved short-circuit behavior. To this end, the switched-mode power supply of the type defined in the opening paragraph is characterized in that the switched-mode power supply further includes means for limiting the minimum value of the current. By limiting the minimum value Ipmin the average output current is limited to a value smaller than n*Ipmax.

To limit the minimum value of the primary current, an embodiment of a switched-mode power supply in accordance with the invention is characterized in that the means for limiting include: means for generating a measurement signal having an amplitude which is a measure of the minimum value of the current at the beginning of the on period, means for comparison of the measurement signal with a reference signal, and means for changing the ratio between the on period and the off period in response to the comparison.

At the beginning of the on period, i.e. when the primary current has the minimum value Ipmin, the measurement signal is compared with a reference value. On the basis of the comparison the ratio between the on period and the off period is changed, for example, by prolonging the off period in such a manner that the minimum value Ipmin does not exceed a given maximum. As a result of this, the output current remains constant when the load is short-circuited.

The magnitude of the minimum value Ipmin can be measured by means of a sensing resistor in series with the controllable switching element and a differentiating network which differentiates the voltage across the sensing resistor. The amplitude of the leading edge in the differentiated signal at the beginning of the on period is a measure of the magnitude of the minimum value Ipmin. By means of a comparator this amplitude can be compared with a reference signal and can subsequently be averaged. The resulting average comparison signal influences, for example, the off period so as to prolong the off period when the averaged comparison signal increases. The switched-mode power supply then operates so as to maintain the amplitude of the leading edge and, consequently, the magnitude of the minimum value Ipmin constant.

The comparator can also be used for limiting the output voltage of the switched-mode power supply. In the case of an output voltage which is too high the comparator can cause the off period to be extended, as a result of which the power supplied to the load and, consequently, the output voltage decreases. The output voltage can be determined by measuring the voltage step which occurs across an auxiliary winding or directly across the inductive element during the off period and by adding this voltage step to the differentiated signal, the annoying voltage surge superposed on the voltage step owing to the leakage self-inductance of the inductive element being suppressed by means of the trailing edge of the differentiated signal at the end of the on period.

As a result of its short-circuit characteristics the switched-mode power supply is very suitable for apparatuses using a rechargeable battery, particularly apparatuses having a wall mount or stand in which the power supply is accommodated and which has pins which make contact with the apparatus when it is placed into the stand. The switched-mode power supply is also suitable for use in a mains voltage adapter or power plug which supplies a low voltage to an electrical apparatus with or without a rechargeable battery.

BRIEF DESCRIPTION OF THE INVENTION

These and other aspects of the invention will be described and elucidated with reference to the accompanying drawings, in which.

In these Figures parts having a like function or purpose bear the same reference symbols.

DESCRIPTION OF THE PREFERRED EMBODIMENTS

Figure 1:
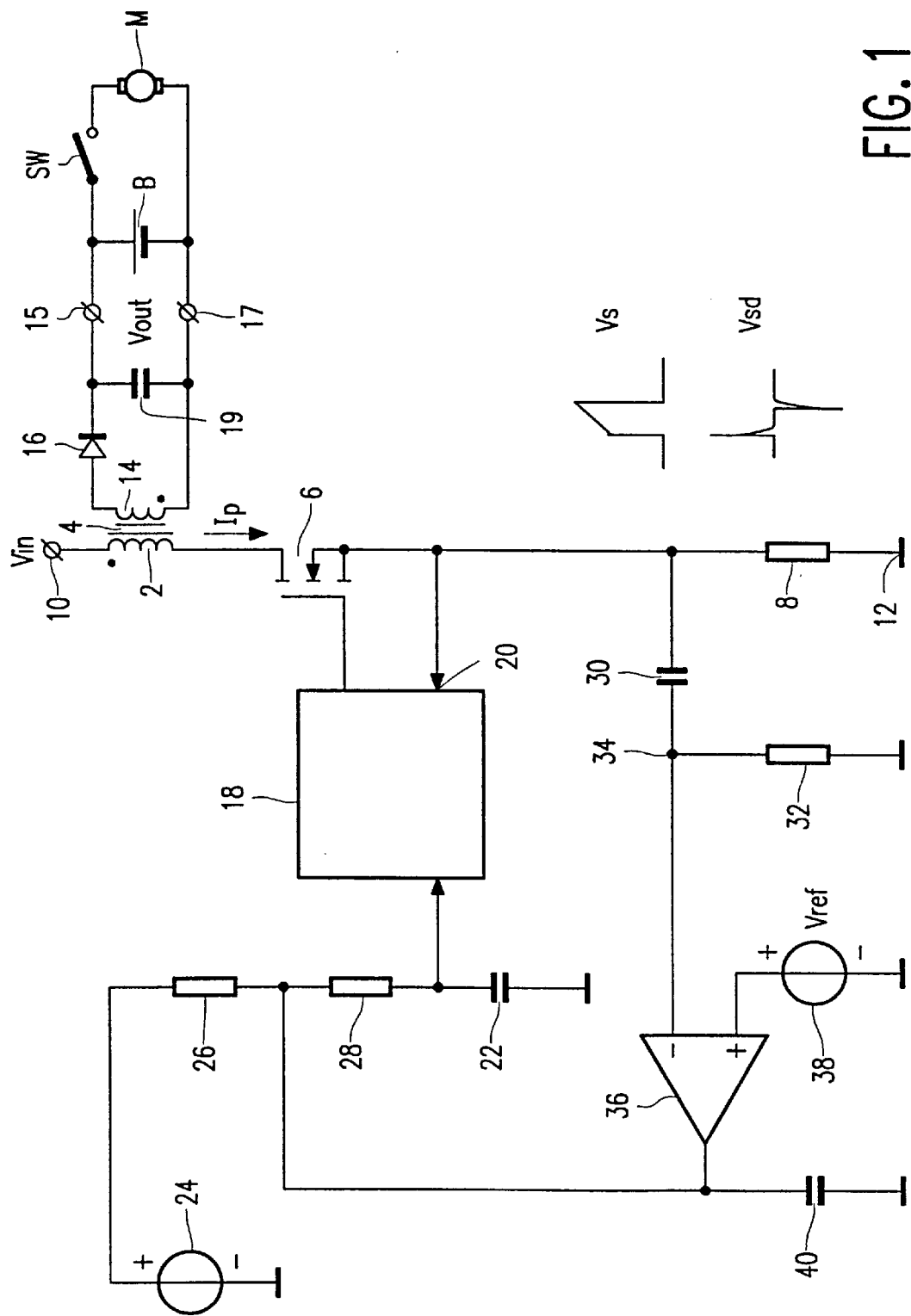
FIG. 1 is a block diagram of a first embodiment of a switched-mode power supply in accordance with the invention.

FIG. 1 shows the block diagram of a switched-mode power supply in accordance with the invention. An inductive element, in the present case a primary winding 2 of a transformer 4, in series with a controllable switching element, in the present case a switching transistor 6, and a sensing resistor 8, is connected between a supply terminal 10 and a ground terminal 12 for receiving an input voltage Vin, for example, derived from the rectified mains voltage. The transformer 4 has a secondary winding 14 connected to a load via a rectifier diode 16, which load is shown, by way of example, as a rechargeable battery B and a motor M, which can be arranged in parallel with the battery B by means of a switch SW. The switched-mode power supply, the battery B, the switch SW and the motor M can form part of an electrical apparatus, for example a shaver, having rechargeable batteries which are charged from the mains voltage. The switched-mode power supply can be accommodated in the electrical apparatus itself, in a wall mount or a stand, or in a mains voltage adapter, also referred to as a power plug. In the two last-mentioned cases the load is connected to the rectifier diode 16 and the secondary winding 14 via two contacts 15 and 16, across which a capacitor 19 is arranged.

Figure 2:
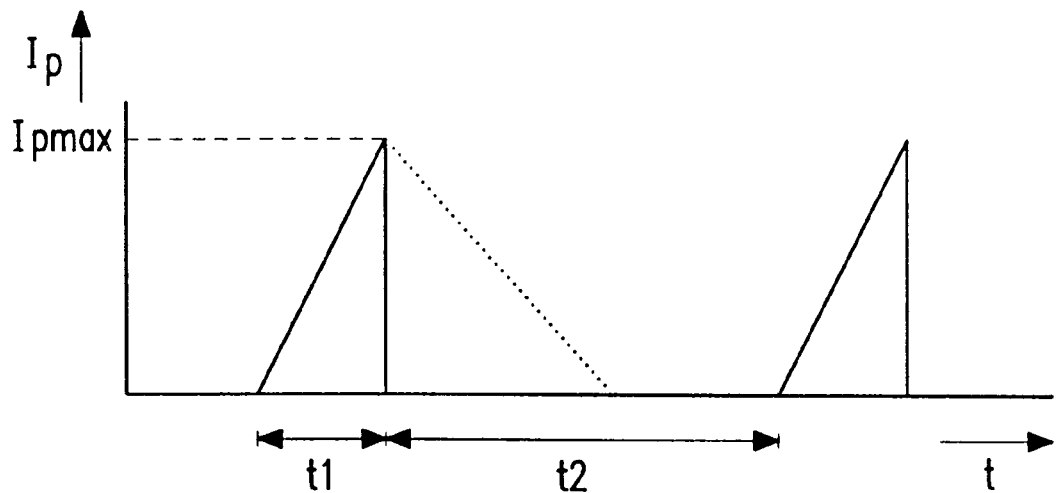
FIG. 2 is a diagram representing the variation of the primary current when a switched-mode power supply in accordance with the invention operates in the discontinuous conduction mode.

The switching transistor 6 is controlled by a control unit 18, which recurrently turns on the switching transistor 6 for an on period t1 and subsequently turns off this transistor for an off period t2. At the beginning of the on period t1 the switching transistor 6 is turned on, as a result of which a primary current Ip begins to flow through the primary winding 2, the switching transistor 6 and the sensing resistor 8. The primary current Ip increases to a given maximum value Ipmax, as is shown in FIG. 2. The rectifier diode 16 is then cut off. The voltage Vs across the sensing resistor 8 then also increases to a maximum value. The voltage Vs is applied to a sensing input 20 of the control unit 18 and as soon as the voltage Vs exceeds the maximum value the control unit 18 turns off the switching transistor 6. This is followed by an off period t2 whose length is determined by the time required to charge a capacitor 22 to a given voltage from a voltage source 24 via two series-connected resistors 26 and 28. When the voltage across the capacitor 22 exceeds a given threshold the control unit 18 again turns on the switching transistor 6 and, moreover, the capacitor 22 is discharged. As a result of the interruption of the primary current Ip the sign of the voltage across the secondary winding 14 is reversed. The rectifier diode 16 is now conductive and a decreasing secondary current flows through the load, which current is shown dotted in FIG. 2, as a current transformed to the primary side. Upon expiry of the off period t2 a new cycle begins.

Figure 3:
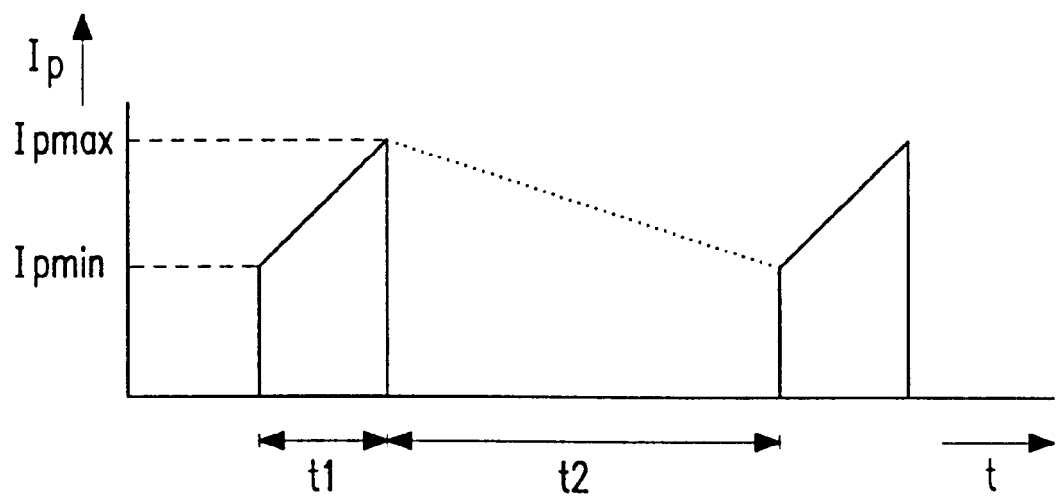
FIG. 3 is a diagram representing the variation of the primary current when a switched-mode power supply in accordance with the invention operates in the continuous conduction mode.

In a manner not shown in FIG. 1 the voltage Vout across the load is maintained constant by varying the ratio between the on period t1 and the off period t2. When the load increases more power is required, as a result of which the off period t2 becomes increasingly shorter and the switched-mode power supply begins to operate in the continuous conduction mode, in which, as illustrated in FIG. 3, the primary current Ip is already switched on before the secondary current has decreased to zero. In that case the initial value of the primary current Ip is not zero but has a minimum value Ipmin when the switching transistor 6 is turned on. During the on period t1 the primary current Ip increases from the minimum value Ipmin to the maximum value Ipmax. During the subsequent off period t2 a decreasing secondary current flows through the load.

In the case of a short-circuit of the load or in the case of overloading the secondary current must be limited in order to prevent the power supply circuit and/or the load from being destroyed. Limiting of the primary current Ip to the value Ipmax cannot prevent the average secondary current from rising to a high value when the power supply operates in the continuous conduction mode. When the load is short-circuited the average secondary current is approximately equal to n*(Ipmax+Ipmin)/2, where n is the transformation ratio between the primary winding 2 and the secondary winding 14. In the case of a short-circuit the secondary current can hardly decrease during the off period t2 and the maximum value Ipmax is reached almost immediately in the subsequent on period tl. As a result, the average secondary current rises to approximately n*Ipmax.

According to the invention, the secondary current is limited by not only maintaining the maximum value Ipmax of the primary current Ip constant but also by preventing the minimum value Ipmin of the primary current Ip from exceeding a given value. Thus, in the case of a short-circuit the minimum value Ipmin cannot rise to Ipmax and the average secondary current is limited to a safe value. The minimum value Ipmin can be limited by changing the ratio between the on period ti and the off period t2 in such a manner that the resulting value of Ipmin does not exceed the desired value. This can be achieved, for example, by prolonging the off period t2.

The minimum value Ipmin can be measured by differentiating the voltage across the sensing resistor 8 by means of a differentiating network comprising a capacitor 30 and a resistor 32, which are interconnected in a node 34. In FIG. 1 the signal Vs represents the variation of the voltage across the sensing resistor 8 in the continuous conduction mode, while the signal Vsd represents the differentiated signal on the node 34. The amplitude of the leading edge in the signal Vsd is a measure of the value Ipmin. By means of a comparator 36 the signal Vsd is compared with a reference voltage Vref supplied by a reference voltage source 38. The output signal of the comparator 36 is averaged by means of a capacitor 40 and is applied to the node between the resistors 26 and 28. The output signal of the comparator 36 thus influences the charging time of the capacitor 22 and hence the length of the off period t2. The switched-mode power supply now operates so as to maintain a constant amplitude of the leading edge in the signal Vsd. The power supply then functions as a current source with a limited average secondary current.

Figure 4:
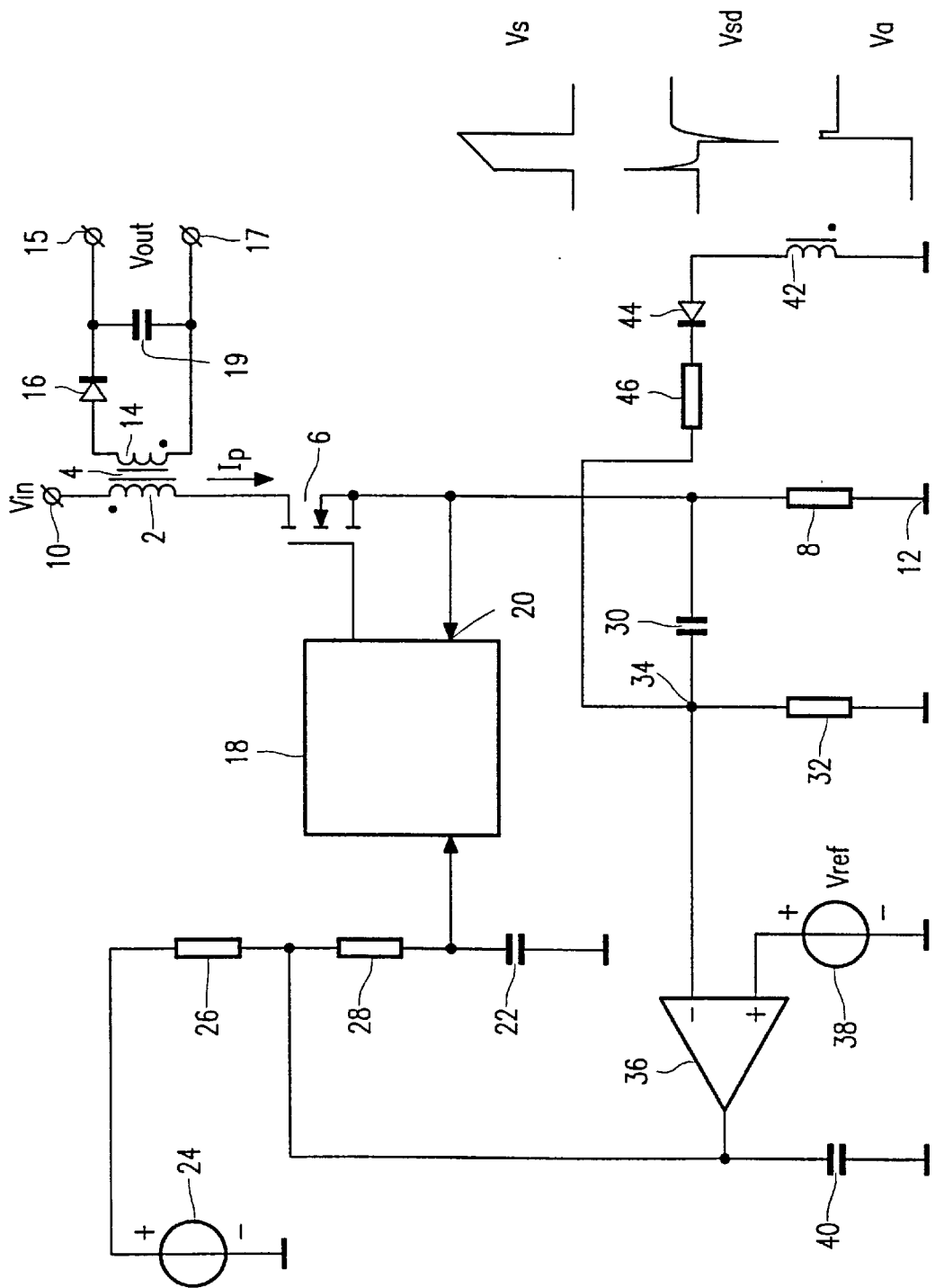
FIG. 4 is a block diagram of a second embodiment of a switched-mode power supply in accordance with the invention.

The comparator 36 can also be used for limiting the output voltage Vout across the load. In the case where the output voltage is too high the comparator 36 can cause the off period to be prolonged, as a result of which the power delivered to the load and, consequently, the output voltage Vout decreases. FIG. 4 shows an embodiment in which the voltage Vout is measured by means of an auxiliary winding 42. During the off period t2 a signal voltage Va, which is a measure of the output voltage Vout, appears across the auxiliary winding 42. The signal voltage Va is applied to the node 34 via a diode 44 and a resistor 46 and is compared with the reference voltage Vref by means of the comparator 36. The leakage inductance of the transformer 4 produces a large voltage transient in the signal Va upon turn-off of the switching transistor 6, but this transient is suppressed by the negative trailing edge in the signal Vsd, which also appears on the node 34. The diode 44 isolates the node 34 from the auxiliary winding 42 during the on period t1 and also compensates for the voltage drop across the rectifier diode 16.

Figure 5:
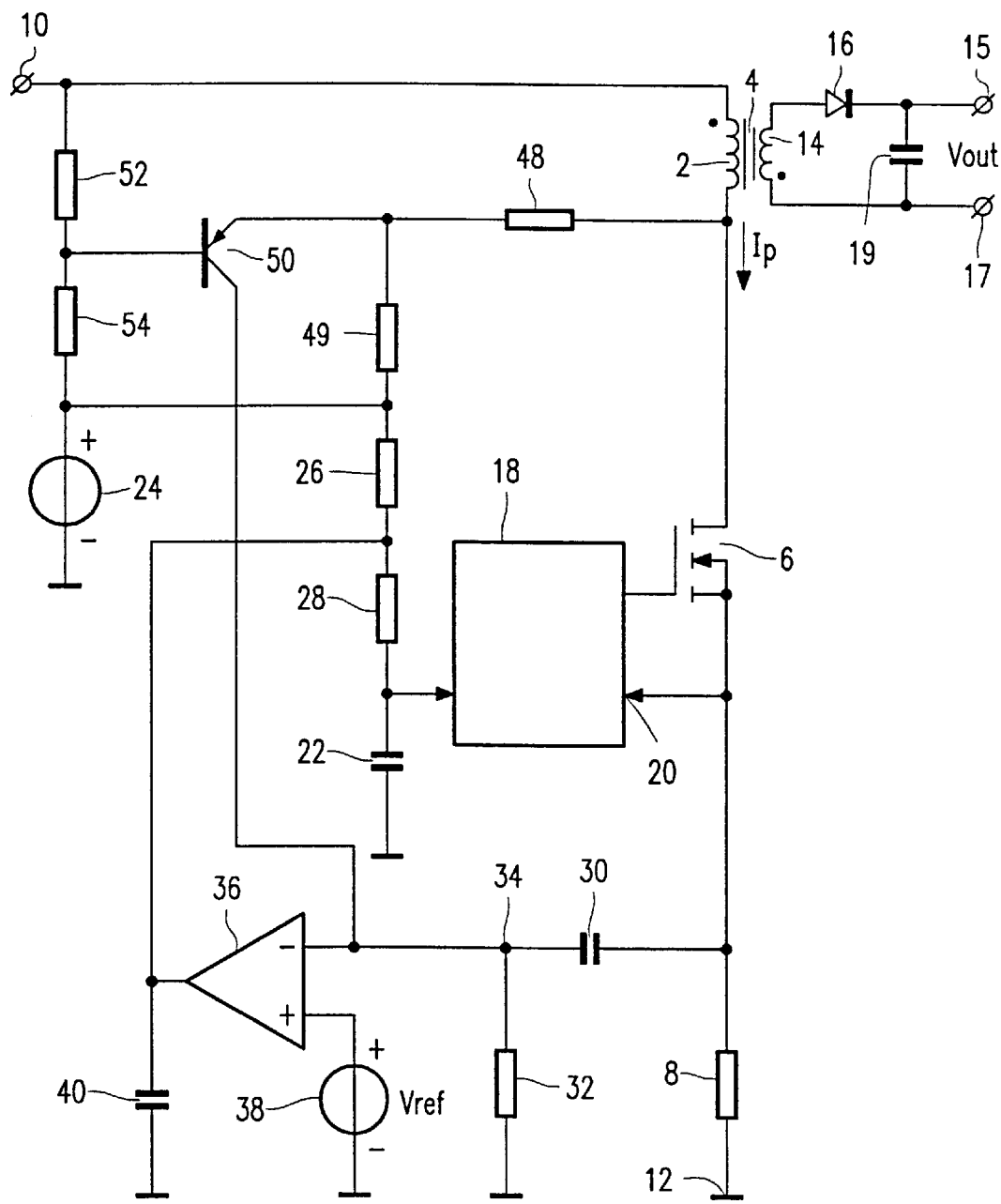
FIG. 5 is a block diagram of a third embodiment of a switched-mode power supply in accordance with the invention.

FIG. 5 shows a variant in which the voltage Vout is measured directly across the primary winding 2. The node between the switching transistor 6 and the primary winding 2 is connected to the emitter of a PNP transistor 50 via a resistor 48. This transistor has its base connected to the node between two resistors 52 and 54, arranged in series between the supply terminal 10 and the voltage source 24, and has its collector connected to the node 34. The emitter of the transistor 50 is also connected to the voltage source 24 via a resistor 49. In the off period t2 the voltage on the node between the switching transistor 6 and the primary winding 2 is higher than the voltage Vin. The voltage dividers comprising the resistors 52 and 54 and the resistors 48 and 49 have been dimensioned in such a manner that the base-emitter junction of the transistor 50 then becomes conductive. This drive of the transistor 50 operates independently of the input voltage Vin. Now a current flows through the transistor 50, whose magnitude is mainly determined by the value of the resistor 48. This current also flows through the resistor 32, where it produces a signal voltage having the same waveform as the signal Va in FIG. 4. In the present case the transient voltage is again suppressed by the negative trailing edge of the signal Vsd across the resistor 32.

The power supply circuits in FIGS. 4 and 5 are both current-limited and voltage-limited. The voltage Vout never exceeds a predetermined value. In addition, the average value of the secondary current and, as a consequence, the current supplied to the load is limited. This makes the power supply circuit very suitable as a battery charger.

Figure 6:
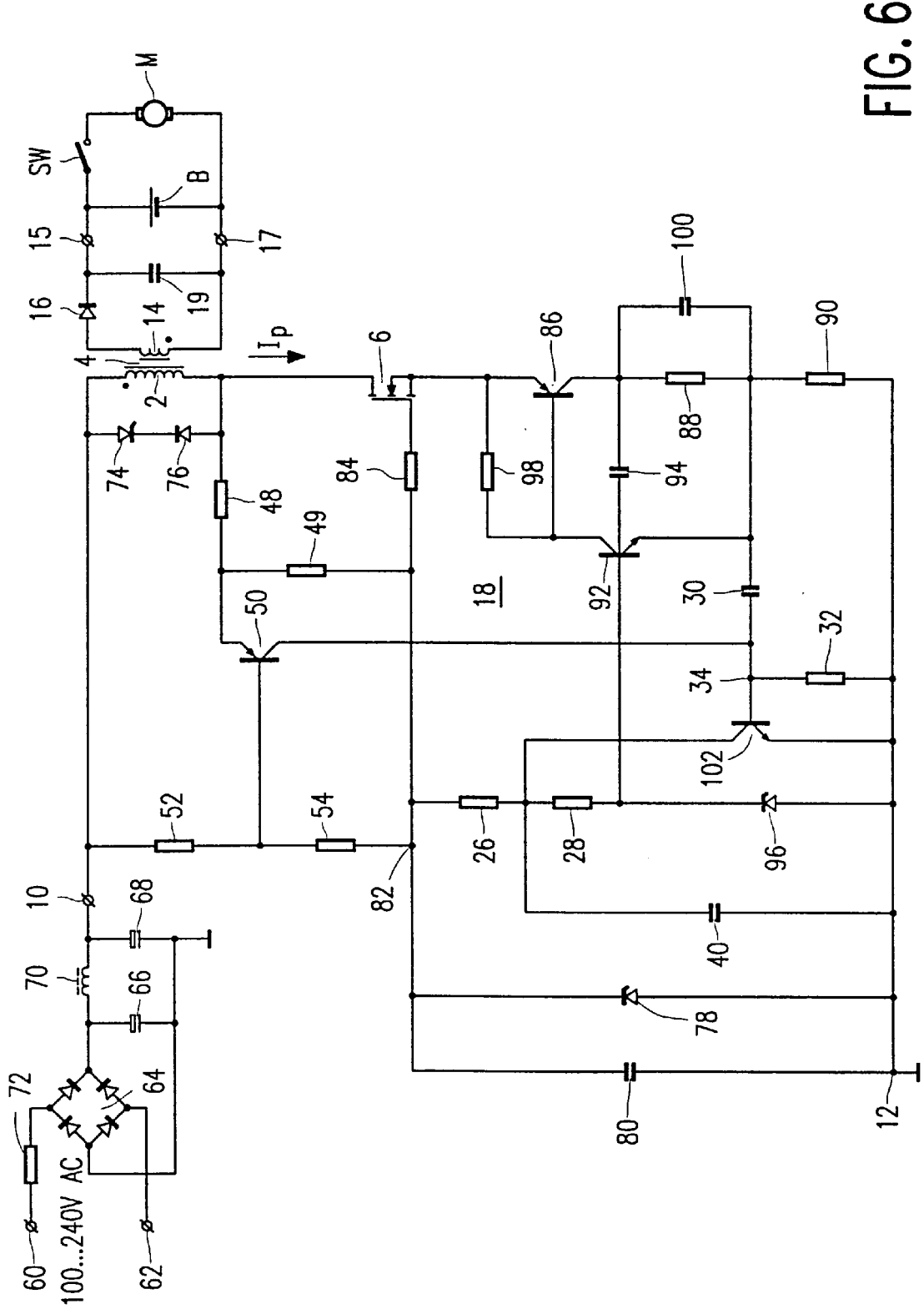
FIG. 6 is a circuit diagram of a fourth embodiment of a switched-mode power supply in accordance with the invention.

FIG. 6 is a detailed circuit diagram of a switched-mode power supply with a current and voltage limitation in accordance with the block diagram of FIG. 5. The a.c. mains voltage or a suitable direct voltage is applied to input terminals 60 and 62. If desired, the a.c. mains voltage can be applied via a transformer (not shown). The a.c. mains voltage is rectified by means of a diode bridge 64 and is smoothed and filtered by means of capacitors 66 and 68 and a coil 70. It is also possible to use a single rectifier diode instead of a diode bridge. An optional resistor 72 limits the current through the diode bridge 64. The negative terminal of the rectified input voltage is connected to the ground terminal 12. The positive terminal 10 is connected to the primary winding 2 of the transformer 4. A zener diode 74 and a diode 76 are arranged in parallel with the primary winding 2 and limit the voltage across the primary winding 2 when the current through the primary winding 2 is interrupted. Instead of the zener diode 74 and the diode 76 shown here, alternative circuits, for example a series arrangement of a capacitor and a resistor, can be used in order to define the variation of the voltage across the primary winding 2.

The voltage source 24 of FIG. 5 is implemented by means of a zener diode 78 and a capacitor 80 between a node 82 and the ground terminal 12. The node 82 is connected to the positive terminal 10 via the resistors 52 and 54.

The control unit 18 is constructed as a discrete monostable multivibrator which drives the switching transistor 6 on its source electrode. The switching transistor 6 has its gate connected to the node 82 via a resistor 84 in order to suppress possible turn-off transients of the switching transistor 6. The switching transistor 6 has its source connected to the emitter of a PNP transistor 86 whose collector is connected to the ground terminal 12 via the sensing resistor. The sensing resistor has been split into two resistors 88 and 90, the resistor 88 being connected to the collector of the transistor 86 and the resistor 90 being connected to the ground terminal 12. The resistors 88 and 90 are connected to one another in a tapping point. An NPN transistor 92 has its emitter connected to this tapping point and has its collector connected to the base of the transistor 86. The timing of the monostable multivibrator is determined by the resistors 26 and 28 and a timing capacitor 94. The resistors 26 and 28 are connected in series between the node 82 and the base of the transistor 92. The timing capacitor 94 is connected between the base of the transistor 92 and the node between the resistor 88 and the collector of the transistor 86. A zener diode 96 is connected between the base of the transistor 92 and the ground terminal 12. The zener diode 96 breaks down if the voltage on the base of the transistor 92 exceeds a given threshold and then forms a low-impedance current path to the ground terminal 12. A resistor 98 is connected in parallel with the base-emitter junction of the transistor 86. A capacitor 100 across the resistor 88 suppresses parasitic oscillations.

The comparator 36 of FIG. 5 comprises an NPN transistor 102, which has its base connected to the node 34, its emitter to the ground terminal 12 and its collector to the node between the resistors 26 and 28, which node is also connected to the capacitor 40 which averages the output signal of the transistor 102. The base-emitter junction voltage Vbe of the transistor 102 functions as the reference voltage Vref. The capacitor 30 of the differentiating network is connected to the node between the resistors 88 and 90.

The transistor 92 is turned on as soon as the timing capacitor 94 has been charged positively via the resistors 26 and 28 to approximately +0.6 V. The transistor 92 then drives the transistor 86 and the switching transistor 6 into conduction. The increasing current through the switching transistor 6 and the transistor 86 produces an increasing voltage across the resistor 88, which voltage is fed back to the base of the transistor 92 via the timing capacitor 94. The timing capacitor 94 provides positive feedback in that a current begins to flow via the timing capacitor 94 to the base of the transistor 92. As a result of this,. the timing capacitor is charged negatively. The transistor 92 remains in the on state until the voltage across the resistor 90 has become equal to the zener voltage of the zener diode 96. From this instant the current through the timing capacitor 94 flows via the zener diode 96 instead of to the base of the transistor 92. The transistor 92 and, consequently, the transistor 86 as well as the switching transistor 6 will then be turned off. When the switching transistor 6 is turned off the voltage across the resistors 88 and 90 ceases. Since the timing capacitor 94 has been charged negatively the transistors 92 and 86 and, consequently, also the switching transistor 6, remain non-conductive until the capacitor 94 has been re-charged positively via the resistors 26 and 28.

If the peak voltage on the node 34 is higher than the Vbe of the transistor 102 the transistor 102 is turned on and pulls the voltage on the capacitor 40 towards a smaller value, as a result of which it takes longer for the timing capacitor 94 to be charged positively. Thus, the off period is extended if the primary current Ip exceeds a given threshold when the switching transistor 6 is turned on.

The resistor 98 contributes to a better defined turn-on instant of the transistor 86. The collector current of the transistor 92 must first build up a threshold voltage across the resistor 98 before the transistor 86 can be turned on. The transistors 50, 86, 92 and 102 can be constructed alternatively as MOS transistors, if desired.

Figure 7:
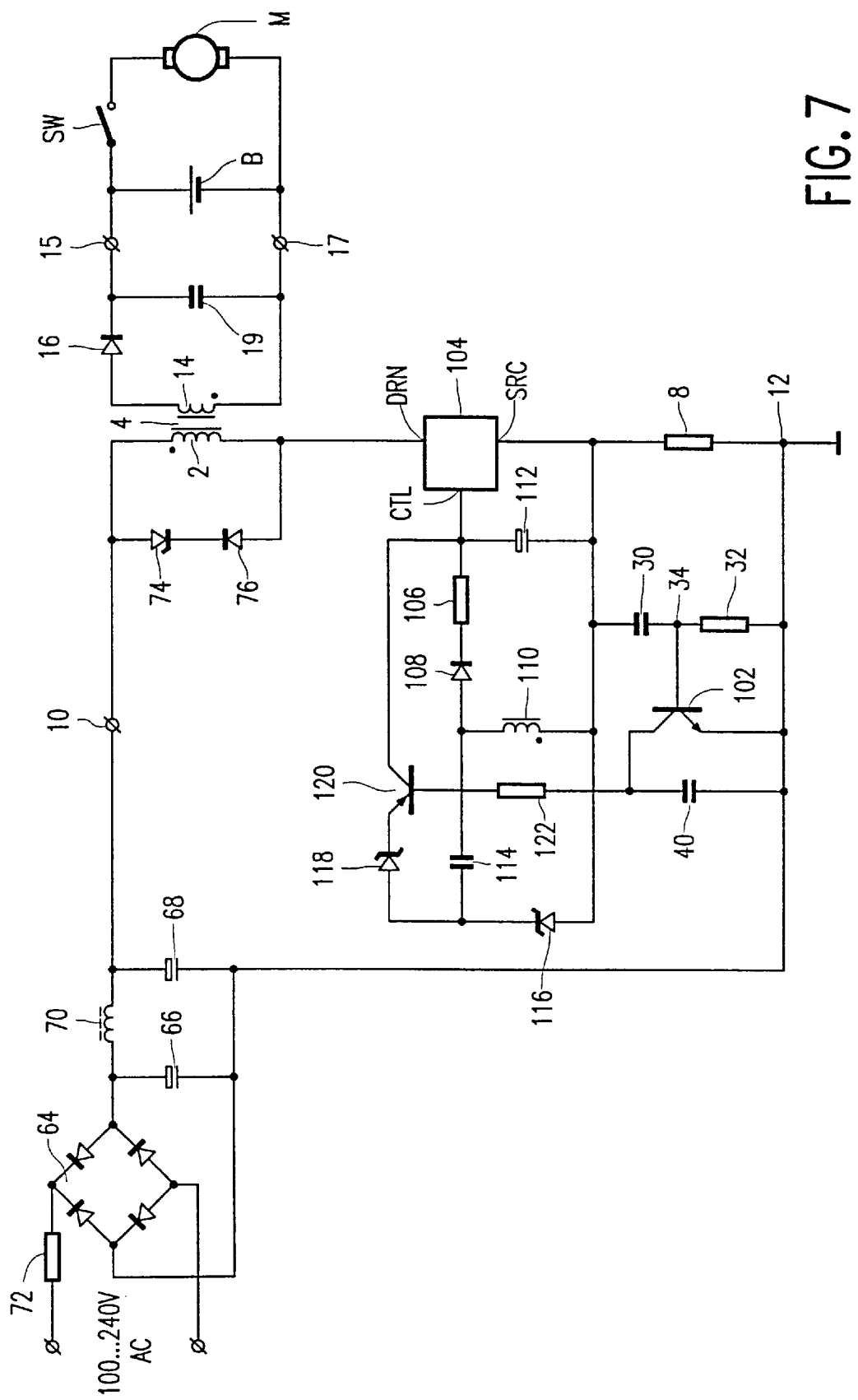
FIG. 7 is a circuit diagram of a fifth embodiment of a switched-mode power supply in accordance with the invention.

FIG. 7 shows an embodiment based on a switcher IC type TOP210 which is commercially available from Power Integrations, Inc. The switcher IC 104 has a terminal DRN ("DRAIN") to which the primary winding 2 is connected, a terminal SRC ("SOURCE"), which is connected to the ground terminal 12 via the sensing resistor 8, and a terminal CTL ("CONTROL"), which is connected to a first terminal of an auxiliary winding 110 of the transformer 4 via a resistor 106 and a diode 108, which auxiliary winding has its other terminal connected to the terminal SRC of the switcher IC 104. The switcher IC controls the output voltage in a manner similar to that described with reference to FIG. 4. A voltage comparable to the signal voltage Va in FIG. 4 appears across the auxiliary winding 110. This voltage is stored in a capacitor 112 connected between the terminals CTL and SRC. The switcher IC 104 controls the duty cycle in response to the current applied to the terminal CTL. In addition to the output voltage control there is provided current-limiting control. The differentiation of the primary current is effected by means of the sensing resistor 8 and a network similar to that of FIG. 4. In the same way as in FIG. 6, the comparator with the associated integrating capacitor comprises the transistor 102 and the capacitor 40. A series arrangement of a capacitor 114 and diode 116 is arranged in parallel with the auxiliary winding 110. The node between the capacitor 114 and the diode 116 is connected to the terminal CTL via a diode 118 and the emitter-collector path of a transistor 120. The base of the transistor 120 is connected to the capacitor 40 by means of a resistor 122. The capacitor 114 and the diodes 116 and 118 form a charge-transfer device which is turned on by means of the transistors 102 and 120. When the transistor 120 is turned on extra current is supplied to the terminal CTL, as a result of which the output current is limited.

Figure 8:
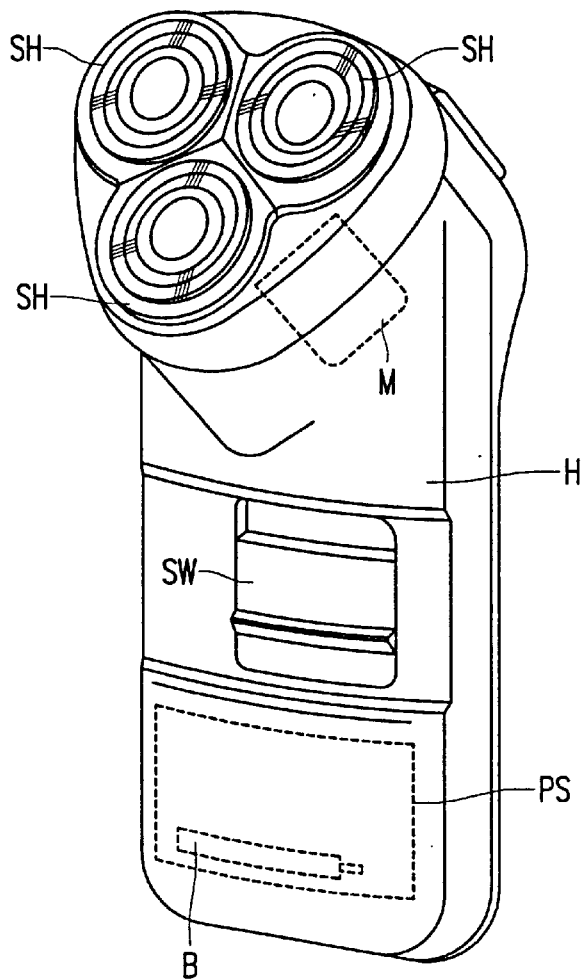
FIG. 8 shows an electric shaver including a switched-mode power supply in accordance with the invention.

The power supply circuit in accordance with the invention is suitable for electrical apparatuses having rechargeable batteries, for example NiCd or NiMH batteries, which are charged from the mains voltage. FIG. 8 shows, by way of example, an electric shaver having a housing H, which accommodates the power supply circuit, referenced PS, the rechargeable battery B and the motor M. The motor drives the shaving heads SH and is activated by means of the switch SW.

Figure 9:
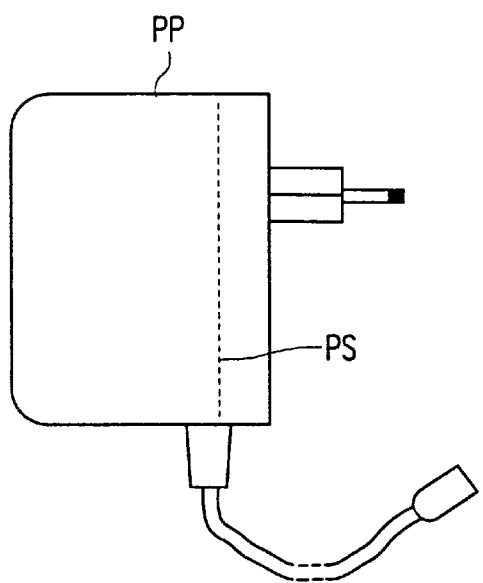
FIG. 9 shows a mains voltage adapter including a switched-mode power supply in accordance with the invention.

FIG. 9 shows a mains voltage adapter or power plug PP including the power supply circuit PS. The power plug PP is adapted to cooperate with the shaver of FIG. 8, in which case the shaver accommodates the rechargeable battery B but does not include the power supply circuit PS.

Figure 10:
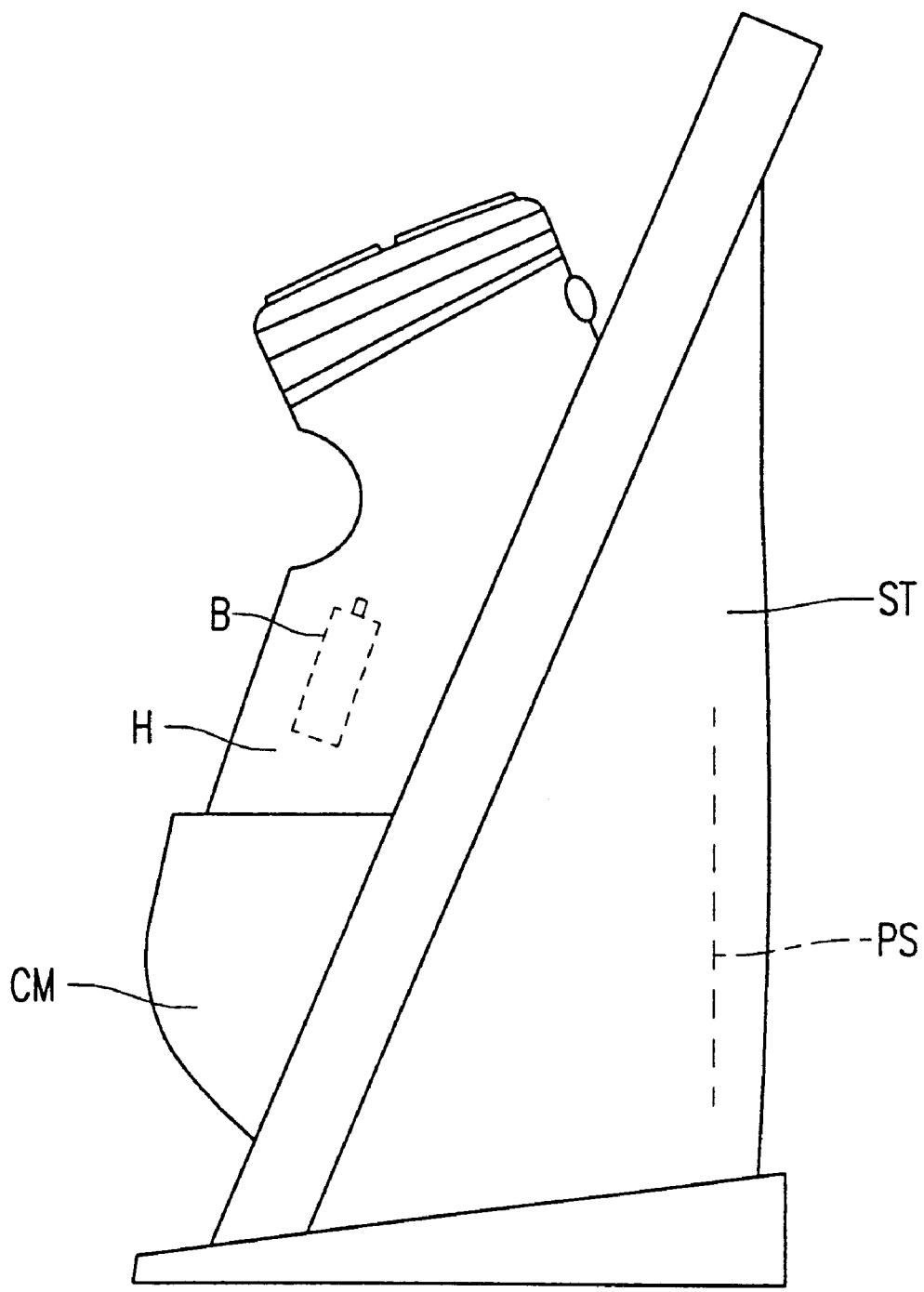
FIG. 10 shows a combination of an electric shaver having a rechargeable battery and a stand including a switched-mode power supply in accordance with the invention for charging the battery.

FIG. 10 shows a combination of a shaver whose housing H is placed in a compartment CM of a stand ST. The stand accommodates the power supply circuit PS which charges the battery B, which is accommodated in the housing H of the shaver, via contacts (not shown) in the compartment CM.

It will be evident that the power supply circuit is also suitable for other electrical apparatuses, with or without rechargeable batteries, such as electric toothbrushes, drills, vacuum-cleaners and the like.

What is claimed is:

1. A switched-mode power supply, comprising: a series arrangement of a controllable switching element and an inductive element connected to receive an input voltage (Vin), means for rendering the controllable switching element conductive during an on period so as to produce a current (Ip) through the series arrangement, which current increases from a minimum value at the beginning of the on period to a maximum value at the end of the on period, and for rendering the controllable switching element non-conductive during an off period, first means for limiting the maximum value of the current (Ip), wherein the switched-mode power supply further includes second means for limiting the minimum value of the current.

2. A switched-mode power supply as claimed in claim 1, wherein the second means for limiting include: means for generating a measurement signal having an amplitude which is a measure of the minimum value of the current at the beginning of the on period, means for comparison of the measurement signal with a reference signal, and means for changing the ratio between the on period and the off period of the controllable switching element in response to the comparison.

3. A switched-mode power supply as claimed in claim 2, wherein the means for generating the measurement signal include: a sensing resistor in series with the controllable switching element, and a differentiating network for deriving the measurement signal by differentiation of a signal voltage across the sensing resistor.

4. A switched-mode power supply as claimed in claim 2, wherein the means for comparison include:
a comparator having inputs for receiving the reference signal and the measurement signal and having an output for supplying a comparison signal, and means for averaging the comparison signal and for supplying an averaged comparison signal.

5. A switched-mode power supply as claimed in claim 4, wherein the means for changing prolong the off period of the controllable switching element in response to the averaged comparison signal.

6. A switched-mode power supply as claimed in claim 3, further comprising: means for generating a further measurement signal which is a measure of a voltage across a load to be powered by the power supply, and means for adding the further measurement signal to the first measurement signal.

7. A switched-mode power supply as claimed in claim 6, wherein the means for generating a further measurement signal include: an auxiliary winding magnetically coupled to the inductive element, and the means for adding comprise a diode for coupling a voltage across the auxiliary winding to the first measurement signal during the off period of the controllable switching element.

8. A switched-mode power supply as claimed in claim 6, wherein the means for generating a further measurement signal comprise the inductive element, and the means for adding comprise: a first voltage divider connected between a reference terminal and a node between the inductive element and the controllable switching element, a second voltage divider connected between a terminal for receiving the input voltage and the reference terminal, a transistor having a first main electrode connected to a tapping point of the first voltage divider, having a second main electrode coupled to an output of the differentiating network, and having a control electrode connected to a tapping point of the second voltage divider.

9. An electric shaver comprising: a rechargeable battery, an electrical load, a switch for connecting the load to the battery, and a switched-mode power supply as claimed in claim 1, for supplying power to at least the battery and/or the load.

10. An electric shaving system comprising: a shaver including a rechargeable battery, an electrical load, a switch for connecting the load to the battery, and a stand including a switched-mode power supply as claimed in claim 1, for supplying power to at least the battery and/or the load.

11. A switched-mode power supply as claimed in claim 1 wherein the inductive element comprises a transformer having a primary winding connected in series with the controllable switching element and a secondary winding coupled to load terminals via a rectifier and with the transformer windings and rectifier arranged so that the rectifier is cut-off during the on period of the controllable switching element.

12. A switched-mode power supply as claimed in claim 1 wherein the means for rendering the controllable switching element conductive and non-conductive comprises a control unit having an output coupled to a control electrode of the controllable switching element, wherein the first means for limiting the maximum value of the current (Ip) includes a sensing resistor in series with the controllable switching element and coupled to a first control input of the control unit so as to signal the control unit to turn off the controllable switching element when the maximum value of the current (Ip) flows through the series arrangement of the inductive element and the controllable switching element, and the second means for limiting the minimum value of the current (Ip) comprises means coupled to the sensing resistor for supplying to a second control input of the control unit a control voltage determined by the minimum value of the current at the beginning of the on period, wherein said control voltage controls when the control unit turns on the controllable switching element.

13. A switched-mode power supply as claimed in claim 3, wherein the means for comparison include:

a comparator having inputs for receiving the reference signal and the measurement signal and having an output for supplying a comparison signal, and means for averaging the comparison signal and for supplying an averaged comparison signal.

14. A switched-mode power supply as claimed in claim 1 wherein the second limiting means comprises means for generating a measurement signal determined by the minimum value of the current at the beginning of the on period of the controllable switching element, and means for generating a further measurement signal determined by the voltage across a load for the power supply, said measurement signal and said further measurement signal adjusting the duty ratio of the controllable switching element via joint control of the means for rendering the controllable switching element conductive and non-conductive.

15. A switched-mode power supply as claimed in claim 14 wherein the measurement signal generating means comprise a differentiating network responsive to a voltage produced by current flow through the controllable switching element, and the further measurement signal generating means comprises an auxiliary winding magnetically coupled to the inductive element and coupled to an output of the differentiating network.

16. A switched-mode power supply as claimed in claim 14 wherein the measurement signal generating means comprise a differentiating network responsive to a voltage produced by current flow through the controllable switching element, and the further measurement signal generating means comprise the inductive element and a transistor coupled between one terminal of the inductive element and an output of the differentiating network.

17. A switched-mode power supply as claimed in claim 16 further comprising a source of reference voltage coupled to a control electrode of said transistor.

18. A switched-mode power supply as claimed in claim 1 wherein the second limiting means comprises means for generating a measurement signal determined by the minimum value of the current at the beginning of the on period of the controllable switching element, and means for generating a further measurement signal determined by the voltage across a load for the power supply, and means for adding the further measurement signal to the first measurement signal to derive a control signal that adjusts the duty cycle of the controllable switching element via said means for rendering the controllable switching element conductive and non-conductive so as to maintain the output voltage of the power supply constant.

19. A switched-mode power supply as claimed in claim 1 wherein the second means for limiting comprises an RC differentiating circuit responsive to a signal determined by the minimum value of the current (Ip) at the beginning of the on period of the controllable switching element.

* * * * *